US008540485B2

(12) United States Patent
Bogrash (10) Patent No.: US 8,540,485 B2
(45) Date of Patent: Sep. 24, 2013

(54) CYCLOIDAL ROTOR WITH NON-CIRCULAR BLADE ORBIT

(76) Inventor: Philip Bogrash, Mellieha (MT)

( * ) Notice: Subject to any disclaimer, the term of this patent is extended or adjusted under 35 U.S.C. 154(b) by 1408 days.

(21) Appl. No.: 12/074,362

(22) Filed: Mar. 4, 2008

(65) Prior Publication Data

US 2009/0226314 A1    Sep. 10, 2009

(51) Int. Cl.
*B64C 27/32* (2006.01)
*B64C 27/54* (2006.01)

(52) U.S. Cl.
USPC .................. 416/1; 416/17; 416/89; 416/109; 244/21

(58) Field of Classification Search
USPC ................. 415/4.2, 4.4, 5, 70, 129, 130, 133; 416/7, 8, 17, 31, 50, 88, 89, 108, 109, 110, 416/115, 116, 87, 1; 244/10, 21
See application file for complete search history.

(56) References Cited

U.S. PATENT DOCUMENTS

| 2,580,428 | A | * | 1/1952 | Heuver | 416/111 |
| 4,025,246 | A | * | 5/1977 | Normandin | 418/151 |
| 5,265,827 | A | | 11/1993 | Gerhardt | |
| 5,735,670 | A | * | 4/1998 | Moffitt et al. | 416/87 |
| 6,435,827 | B1 | * | 8/2002 | Steiner | 416/8 |
| 6,736,600 | B1 | * | 5/2004 | Bannasch | 416/129 |
| 6,932,296 | B2 | | 8/2005 | Tierney | |
| 6,992,402 | B2 | * | 1/2006 | Latyshev | 290/55 |
| 7,410,123 | B2 | * | 8/2008 | Nunnally | 244/23 C |
| 7,436,085 | B2 | * | 10/2008 | Shibata et al. | 290/55 |
| 2007/0296218 | A1 | * | 12/2007 | Jonsson | 290/55 |

* cited by examiner

*Primary Examiner* — Edward Look
*Assistant Examiner* — Jason Davis (57) ABSTRACT

A cycloidal rotor system having airfoil blades travelling along a generally non-circular, elongated and, in most embodiments, dynamically variable orbit. Such non-circular orbit provides a greater period in each revolution and an optimized relative wind along the trajectory for each blade to efficiently maximize lift when orbits are elongated horizontally, or thrust/propulsion when orbits are vertically elongated. Most embodiments, in addition to having the computer system controlled actuators to dynamically vary the blade trajectory and the angle of attack, can also have the computer system controlled actuators for dynamically varying the spatial orientation of the blades; enabling their slanting motion upward/downward and/or backsweep/forwardsweep positioning to produce and precisely control a variety of aerodynamic effects suited for providing optimum performance for various operating regimes, counter wind gusts and enable the craft to move sideways. Thus a rotor is provided, which when used in a VTOL rotorcraft, will require lower engine power to match or exceed the operating performance of VTOL rotorcrafts equipped with prior art cycloidal rotors, this rotor also offers increased efficiency and decreased required power when used for generating the propulsive force for various vehicles or used as a fan.

15 Claims, 7 Drawing Sheets

CYCLOIDAL ROTOR WITH NON-CIRCULAR BLADE ORBIT

BACKGROUND OF THE INVENTION

1. Field of the Invention

This invention relates to a cycloidal rotor and particularly to a cycloidal rotor that enables the blades to follow a non-circular orbit.

2. Description of the Prior Art

Various types of VTOL aircraft have been proposed, with helicopters being the most common type. However, helicopters have speed limitations, high power/fuel requirements compared to lift or thrust generated, limited range, are noisy, and require a tail rotor which takes up engine power while producing neither lift nor thrust, but rather a sideways force which the pilot must counteract. More recently, the potential of aircraft employing cycloidal rotor is increasingly being recognized. Most aircraft have differing requirements in terms of lift and thrust depending on the stage of flight. For VTOL and STOL aircraft in particular it is desirable to have a high lift to thrust ratio for takeoff. Cycloidal rotors have the ability to change the lift to thrust ratio by changing the angle of attack of the blades as they rotate. U.S. Pat. Nos. 5,265,827 and 6,932,296 describe examples of prior art incorporating a cycloidal rotor.

Known cycloidal rotors have the blades rotating in a circular orbit. Accordingly, the period in each revolution during which the blade can produce the desired aerodynamic effect and the kinds of aerodynamic effects that can be produced, are limited by the circular geometry of the orbit and only two available degrees of movement; rotational around the central axis and rotational blade pitch.

Cycloidal rotors can be used for various other applications including providing propulsion for various types of vehicles, aircraft, watercraft, or for moving air, as for a fan. It can be seen that it would be desirable to be able to provide a higher ratio of either lift or thrust under different flight conditions, and/or to provide increased efficiency for lift and thrust generation in flight, propulsion, and other applications. Furthermore, increased manoeuverability, ability to move sideways as well as a greater ability to adjust assuring a lessened susceptibility to gusts of wind and other changes in the operating environment are desirable.

SUMMARY OF THE INVENTION

An object of the present invention is to provide a cycloidal rotor with improved efficiency resulting in ability to generate substantially greater lift/thrust, or propulsive force per unit of power used.

Another object of the invention is to provide a rotor that allows the ability to shape the blade orbit/trajectory to maximize or minimize the ratio of lift to thrust when required.

Another object of the invention is to provide a rotor system that allows differential and variable orbital positioning and spatial orientation of the blades for flexibility in the produced aerodynamic effects suited for various operating regimes and conditions.

Another object of the invention is to increase the efficiency of a cycloidal rotor for various applications.

With the present invention, the lift or thrust capabilities of a cycloidal rotor can be significantly improved. Providing a cycloidal rotor wherein the orbit of the blades can be elected and optimized and changed when the operational regime or conditions change provides significant advantages over a cycloidal rotor with the conventional circular orbit. Specifically, a non-circular orbit, such as elliptical or elongated, provides a greater period and distance in each revolution for each blade to provide the desired lift or thrust. When the rotor of the present invention works in a regime where vorticity based effects are utilised, the ability to select and dynamically adjust the blade's trajectory and spatial orientation allows control of the formation, spanwise movement, retention and shedding of the leading and trailing edge vortexes. Conversely, on linear or nearly linear, portions of the blade trajectory the aerodynamics of the rotor of the present invention can, depending on the angle of attack, be conventional steady state flow thus allowing much greater efficiency at high speeds of rotation where prior art circular orbiting cycloidal rotors become inefficient. Minute variability of the individual blades' trajectory can allow the avoidance of the preceding blade's wake making possible greater rotor solidity.

When countering gusts of wind or atmospheric turbulence, changes in the blades' trajectory and spatial orientation in combination with the resulting instant changes in the blades' linear speed and the changes in the angle of attack are more effective than the changes in the angle of attack alone offered by prior art rotors.

For a particularly elongated orbit, said trajectory variability allows the recapture of the vortexes shed by the blades moving in the opposite direction, thus recovering their energy, as practiced by many natural flyers, thereby further increasing the efficiency of the rotor. Orbit optimization for any given regime of flight provides greater efficiency of the rotor.

The present invention provides a cycloidal rotor system having at least one airfoil blade mounted for orbiting about a central region; blade supporting means operative to position the blade to follow a generally non-circular trajectory about the central region; blade pitch adjusting means for adjusting the blade angle-of-attack and drive means for propelling the blades about said trajectory.

DESCRIPTION OF THE PREFERRED EMBODIMENTS

Figure 1:
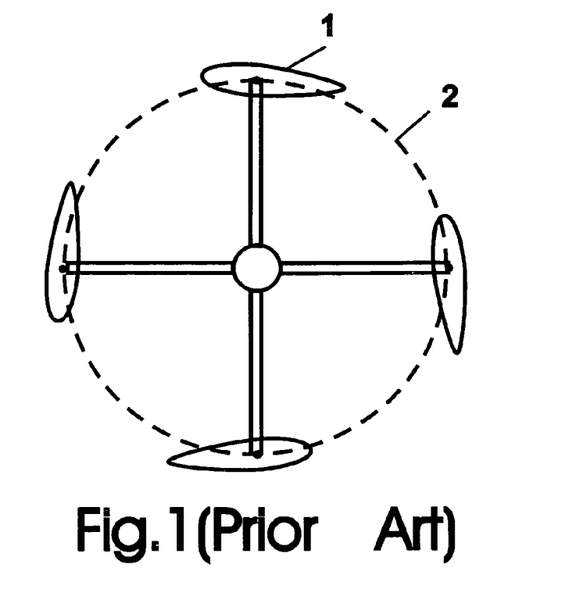
FIG. 1 is a schematic representation of a cycloidal rotor of the prior art.

FIG. 1 illustrates schematically a cycloidal rotor of the prior art, showing the blades 1 following a circular orbit 2. Such rotors can include mechanisms, not shown, that vary the pitch of the individual blade as it orbits.

Figure 2:
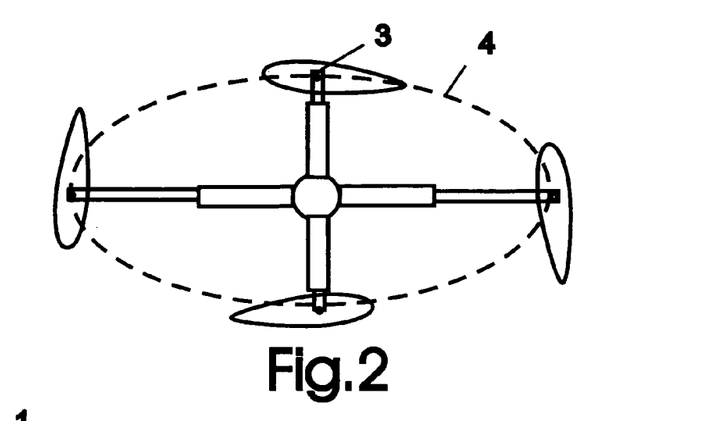
FIGS. 2 and 3 show a schematic representation of the cycloidal rotor of the present invention illustrating the differences from the prior art.
Figure 3:
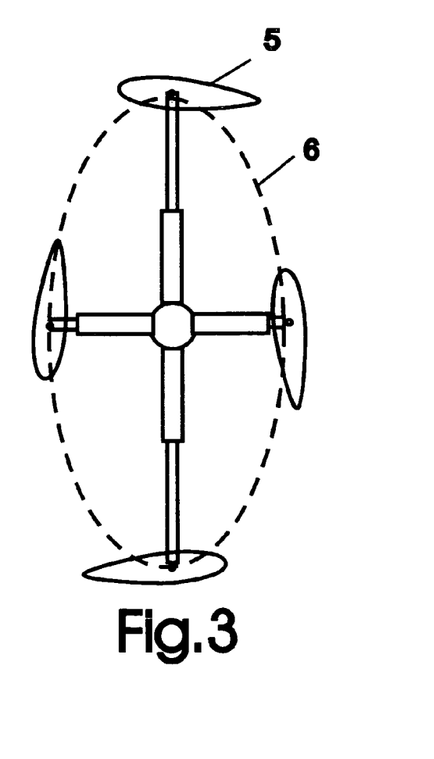

FIGS. 2 and 3 illustrates schematically a cycloidal rotor of the present invention showing the difference from the prior art as shown in FIG. 1. Specifically, the blades 3 follow a non-circular, elongated orbit about a central region. In FIG. 2 the blades 3 follow a horizontally elongated orbit 4 suited for high lift, while in FIG. 3 the blades 5 follow a vertically elongated orbit 6 suited for high thrust. To provide the desired orbit, the rotors include mechanisms, not detailed, that vary the radial distance between the blade and the axis of rotation. Examples of mechanisms for providing non-circular orbit are described below.

Figure 4:
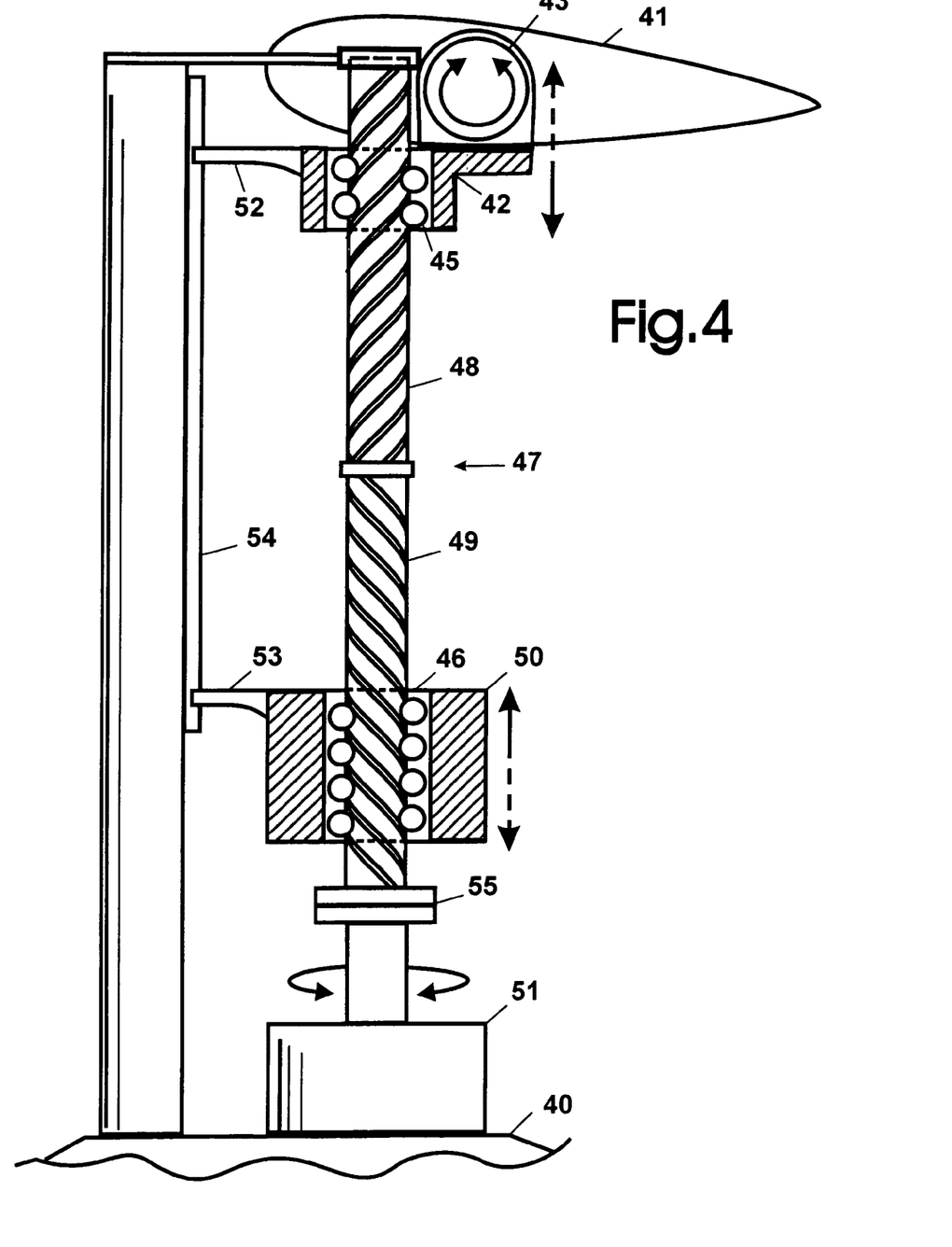
FIG. 4 is a partly sectional view illustrating one embodiment of a mechanism for allowing variable non-circular orbiting of the blades.

FIG. 4 illustrates one embodiment of a mechanism for interconnecting the blades (one shown) with hub and providing variable radius. FIG. 4 shows one blade 41 mounted on a central hub 40. The blade 41 is pivotally mounted on blade supporting assembly 42. A rotational actuator/vector motor 43 independently controls the pitch of the blade 41. The blade supporting assembly 42 is movably mounted to travel along screw shaft 47 using ball nut 45. The screw shaft 47 has two separate thread portions 48 and 49 which have opposite pitches. Ball nut 45 is attached to, and adapted to move the blade supporting assembly 42 along thread portion 48, while ball nut 46 is attached to, and adapted to move a counterweight 50 along screw portion 49, in the opposite direction. The blade supporting assembly 42 and counterweight 50 are prevented from turning by fork members 52 and 53, respectively, by slidably engaging the fixed guide member 54. Rotational actuator/vector motor 51 is connected by suitable coupling 55 to rotate the screw 47. Activation of the motors 43 and 51 is controlled by suitable control means, such as detailed herein with reference to FIG. 11.

In operation, to change the radial position of the blade, motor 51 rotates the screw shaft 47. Rotation of screw 47 moves the ball nuts 45 and 46, along with the attached blade supporting assembly 42 and counterweight 50, in opposite directions. This provides for the change of radial position of the blade 41 and at the same time moves the counterweight 50 in the opposite direction to maintain balance of the rotating mass.

Figure 6:
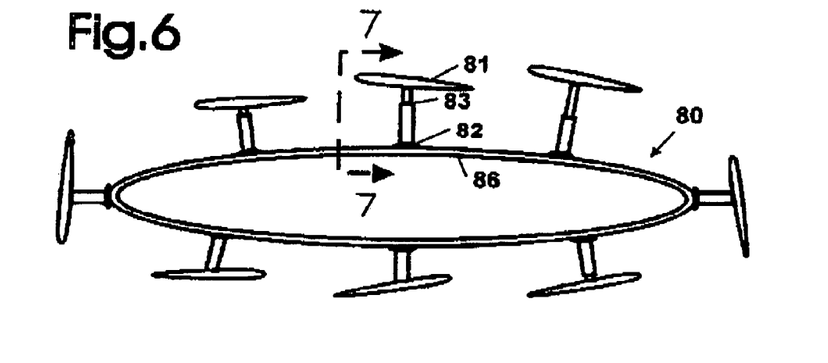
FIG. 6 is a schematic side view of another embodiment of the invention utilizing magnetic levitation for supporting and electromagnets for supporting and propelling the blades.
Figure 7:
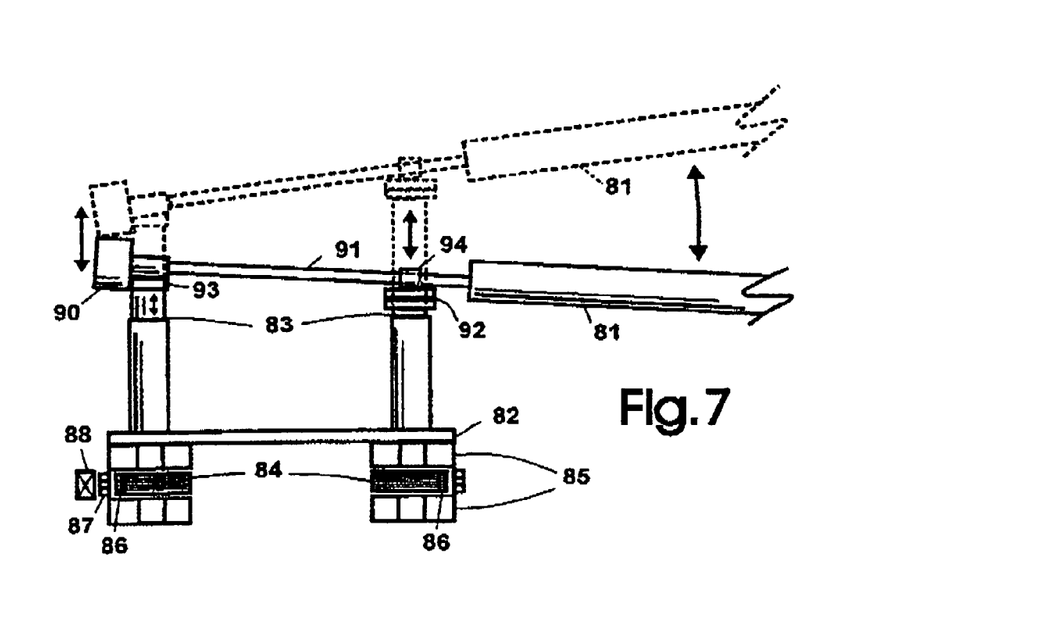
FIG. 7 shows a section taken at 7-7 of the embodiment of FIG. 6.
Figure 10:
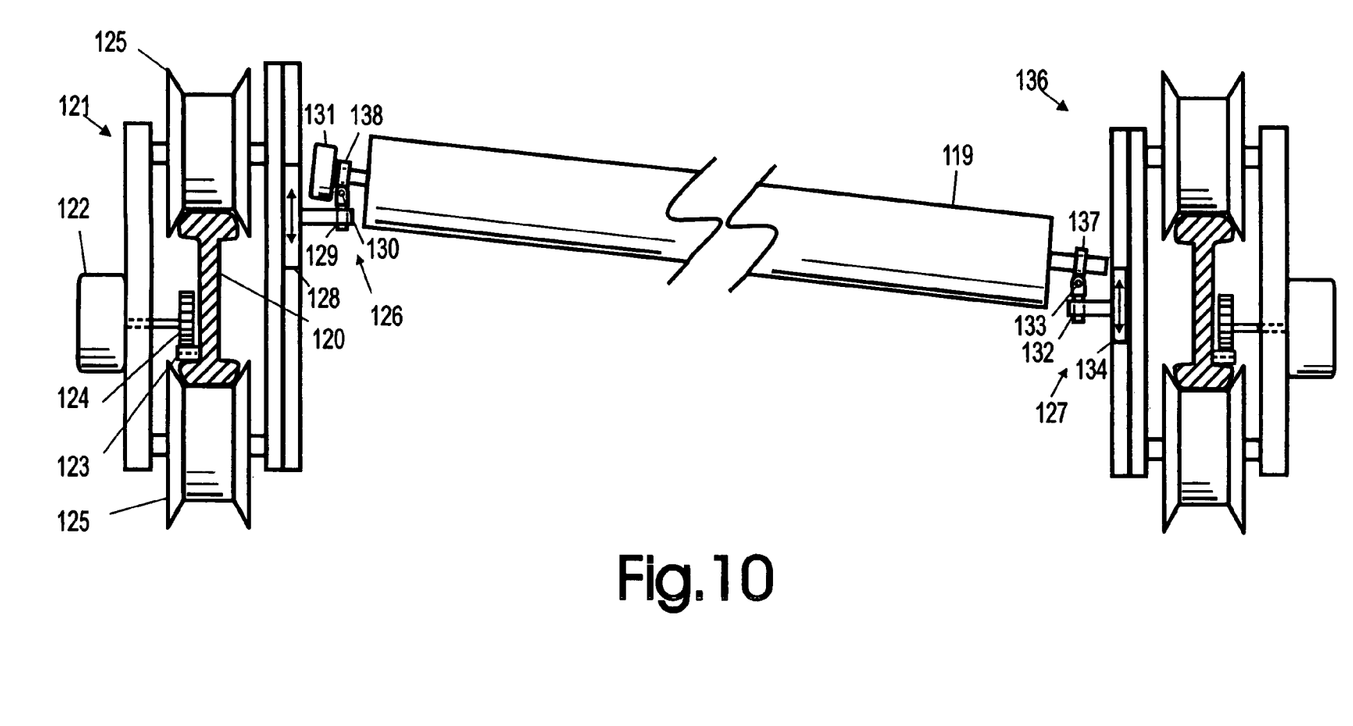
FIG. 10 is a schematic view of another embodiment with the blades driven along tracks and including mechanisms for modifying blade trajectories and altering the spatial orientation of the blades.

It is understood that another similar embodiment can be implemented with backsweep/forwardsweep yaw positioning of the blade capability, as well as the ability to minutely vary the blade linear speed independently of the blade supporting assembly speed in the similar manner as it is implemented in embodiment in FIG. 10 or embodiment in FIGS. 6 and 7. In such embodiment the blade can be moved back by linear motors mounted on blade supporting assemblies on both ends of the blade to decrease the speed and likewise can be moved forward to briefly increase the speed of the blade and to reposition it, thus smoothing out blade's linear speed variations due to the geometry of the orbit. The counterbalance will be provided with the ability to be moved laterally in the opposite direction by a linear motor or through mechanical linkage to the blade mount, such as racks and pinions.

Figure 5:
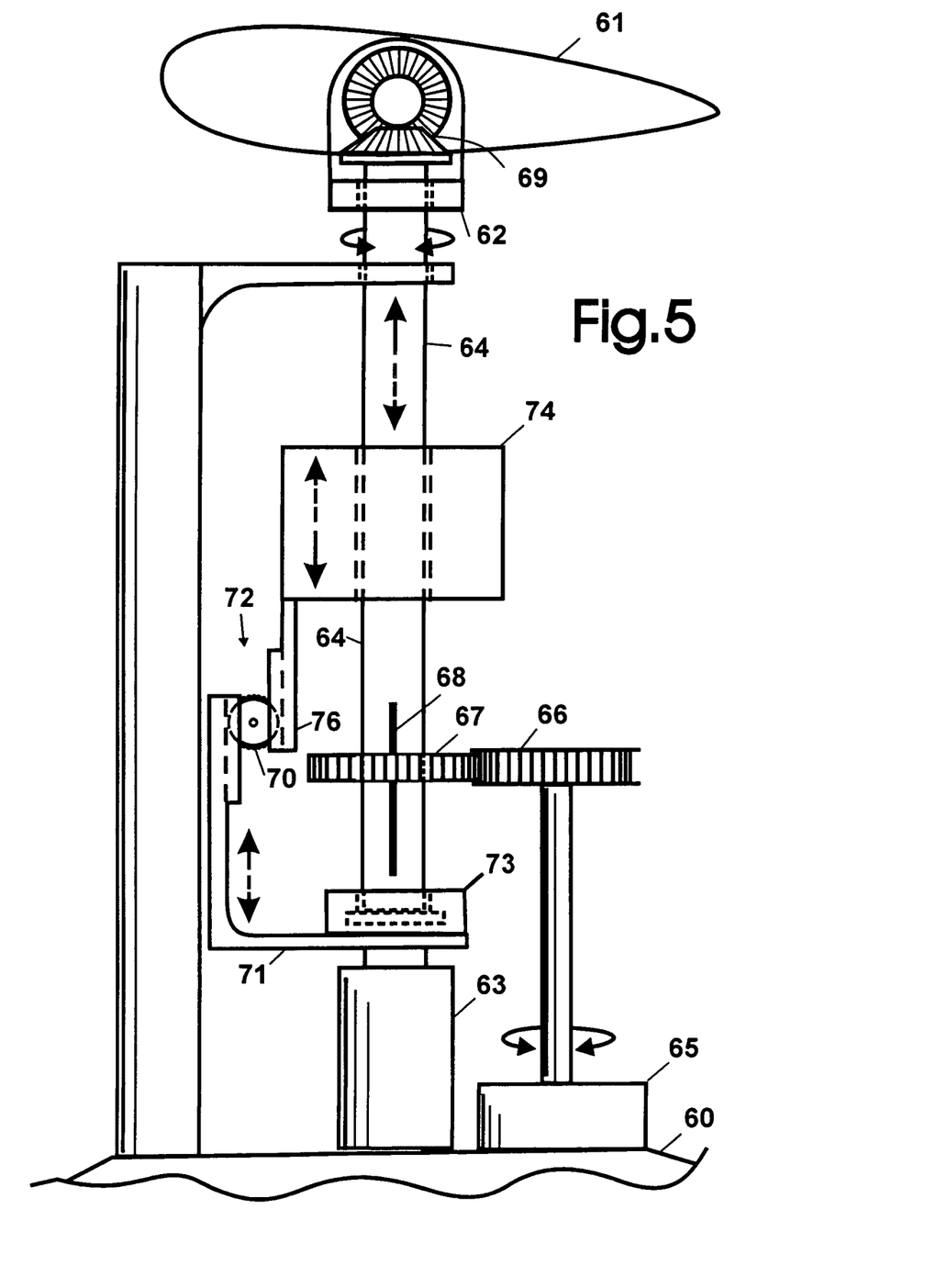
FIG. 5 illustrates another embodiment of a mechanism for allowing variable non-circular orbiting of the blades.

FIG. 5 illustrates another embodiment of a mechanism for interconnecting the blades and providing variable positioning of the blades. FIG. 5 shows one blade 61 interconnected to a central hub 60. The blade 61 is pivotally mounted on blade supporting assembly 62 utilizing bevel gears 69 attached to a rotatable shaft 64. The shaft 64 is rotatably supported by a suitable thrust bearing 73. The angle of attack of blade 61 is adjusted by means of the rotational actuator 65 through gears 66 and 67, shaft 64, and bevel gears 69. Gear 67 is slidably attached by means of a key 68 to rotate with shaft 64. Linear actuator 63 provides radial positioning of the blade through shaft 64. A counterweight 74 is slidably supported by shaft 64. A rack (76) and pinion (70) mechanism 72 attached to arm 71 is used to move the counterweight 74 in a direction opposite to that of the blade supporting assembly 62.

In operation, linear actuator 63 is used to change the radial position of the blade relative to the central hub 60 via shaft 64. At the same time, this axial motion moves the arm 71 which moves the counterweight 74 in the opposite direction via the rack (76) and pinion (70) mechanism 72, in order to maintain balance of the rotating mass. The angle of attack of blade 61 is adjusted by means of the rotational actuator 65 through gears 66 and 67, shaft 64, and bevel gears 69. Activation of the actuators 63 and 65 is contained by suitable control means, such as detailed herein with reference to FIG. 11.

Another version of this embodiment can have linear actuator 63 mounted in a stationary location next to the shaft rotating the central hub, and connected to a suitable slidable and rotatable coupling mounted on said shaft with said coupling connected with the blade supporting assembly by mechanical links such as belts, chains or racks with pinions. In operation the actuator by moving reciprocally along the said shaft said coupling with the attached mechanical links moves the blade assembly radially in order to change the blade's trajectory. This design version decreases the weight of the rotors and the weight of counterbalances required.

In the above embodiments the blades orbit around a fixed axis of rotation in a central region encompassed by the orbit of the blade. In other embodiments, such as described below, the blades can orbit about a central region defined by the configuration of a blade supporting track.

FIGS. 6 and 7 illustrate an embodiment wherein the blades are mounted on a magnetic levitation carriage for travel on a fixed track in an adjustable and thus changeable elongated orbit. Magnetic levitation carriages are known to be more efficient and have much lower noise and vibration levels.

The blades 81 are supported and positioned by means of the linear actuators 83 which are mounted on carriage 82 which travels along an elongated track 80. With reference to FIG. 7, the track includes laminated sheet conductors 84 and 86. The carriage 82 includes an array of permanent magnets 85 (Halbach Array) above and below of the laminated sheet pack to provide vertical support and positioning of the carriage 82. Lateral positioning of the carriage is provided by laminated sheet conductor pack 86 in conjunction with array of permanent magnets 87 disposed along the track. Propulsion of the carriage 82 is provided by sequentially activated electromagnets 88 that interact with the array of permanent magnets 87 to provide forward motion of the carriage 82.

The angle of attack of the blade 81 is adjusted by a rotary actuator 90 via the shaft 91. Linear motor 92 provides for backsweep/forwardsweep blade positioning (moving perpendicularly to drawing plane). Pivot mechanism 93 with suitable bearing supports one end of blade shaft 91, and allows pivoting of shaft 91 about both horizontal and vertical axis. A suitable bearing 94 allows rotation and sliding of the other end of shaft 91.

FIG. 7 shows, by dotted lines, how the angle of the blade 81 can be changed by differential positioning of the actuators 83.

The dotted lines outline also demonstrates the ability to vary the distance of the blade 81 from the elongated track 80 through the joint action of the actuators 83.

FIG. 7 shows the blade supported as a cantilever. It will be understood that other versions of this embodiment may have the supporting carriages riding on two parallel tracks with each such track with supporting carriages located on opposite ends of the blades, such as shown in FIG. 10. Also, another embodiment can have the blade carriages travelling on the inside of the track loop, or parallel as in FIG. 10.

In operation variable orientation and positioning of blades provides flexibility for the generation of a variety of aerodynamic effects. Differential blade ends positioning, resulting in the blade slanting outward or inward relative to the track, allows the aircraft to move sideways. Such blade slanting capability can be used for flapping the blade, which can be done with a desired frequency while traversing specific trajectory parts, possibly in combination with the blade path changes, thereby producing a flapping and/or undulating motion and resulting in the aerodynamic effects similar to those produced in the flapping flight. Dynamic blade positioning can include various degrees of backsweep, forwardsweep or neutral blade yaw positioning depending on the operational regime and speed. Backswept blades are especially suitable for leading edge vortex retention with resulting high lift.

Another version of this embodiment, or a wheeled version thereof, can have similar cantilever type blade mounts on two parallel tracks (parallel tracks as in FIG. 10), supporting each blade on both ends with said blade consisting of two parts joined somewhere in the middle of the span by either a pivot with two degrees of movement or a ball-joint. Angle of attack changing rotational actuators will be provided on both ends of the blade. Such design provides a blade with dynamically changeable geometry ranging from a straight line to a variety of V-shapes in various planes with each part of the said blade having an independently variable angle-of-attack and spatial orientation and thus being able to work in different, mutually complementing aerodynamic regimes at the same time.

Figure 8:
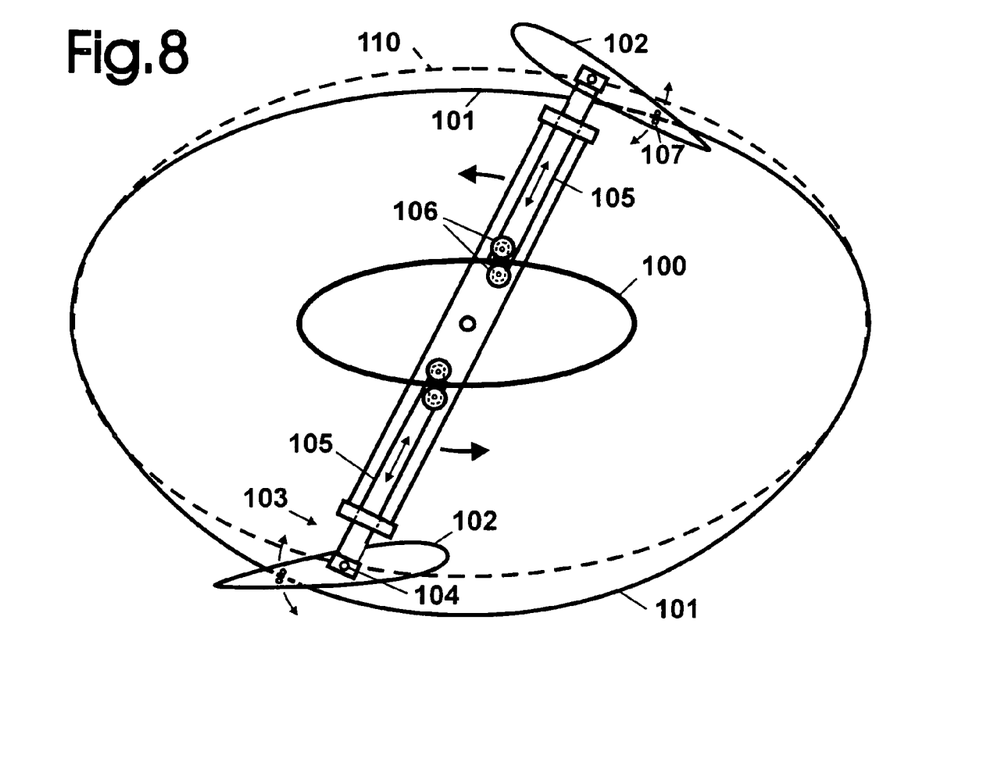
FIG. 8 is a schematic view of another embodiment of a mechanism for positioning the blades for fixed non-circular orbit and changing the angle of attack of the blades.
Figure 9:
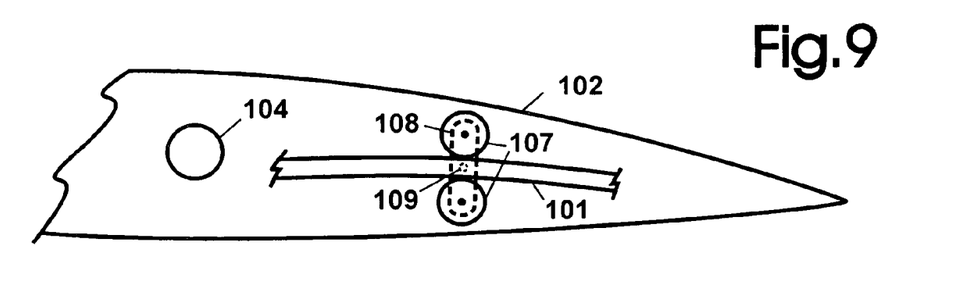
FIG. 9 is an enlarged view of a portion of the apparatus in FIG. 8 showing details of the mechanism for changing the angle of attack.

FIG. 8 illustrates another embodiment of a mechanism having fixed tracks 100 and 101 for positioning the blades 102 for non-circular orbit, and changing the angle of attack of the blades. FIG. 9 shows details of the mechanism for changing the angle of attack.

The blades 102 are pivotally supported, about pivotal axis 104, on a supporting assembly 103 that includes an arm 105 with rollers 106 that follows along the cam track 100. In operation, the blades 102 are positioned radially to follow an orbit 110 determined by the geometry of the track 100 as the blade supporting assembly 103 is rotated, driven by suitable means, not shown.

With reference to both FIGS. 8 and 9, the angle of attack of blade 102 is established by track 101 by means of a pair of rollers 107 attached to the blade 102, as detailed in FIG. 9. To provide balance, the track 100 needs to be symmetrical. Also, the arms 105 need to be symmetrical and even in number, so as to assure that radial positioning of the blade supporting assemblies 103 is mirrored on the other side of the track 100. As the blades 102 are balanced around their pivots 104 and all movements of the arms 105 and blade assemblies 103 supported by them are symmetrical and identical this embodiment is self balancing without counterweights. As shown, the rollers 107 are attached to a supporting plate 108 that is pivotally attached to the blade 102 at pivot 109. In operation, the rollers 107 follow the track 101 and pivot the blade about pivot 104 as the supporting assembly is rotated, due to the differences in geometry of track 101 from track 100.

FIG. 10 illustrates an embodiment with the blades 119 supported by a wheeled carriage 121 and driven along track 120. As shown, the wheeled carriage 121 includes a pair of wheels 125 that ride on opposite sides of the track 120. The carriage 121 is propelled by a motor 122 with synchronized pinion (124) drives mounted on the carriage that mesh with a fixed toothed rack 123 located parallel to the track around its perimeter. The carriage 121 supports mechanisms 126 and 127 for altering the spatial orientation of the blades. Mechanism 126 includes a two dimensional linear X-Y motor 128 and pivots 129 and 130. Rotational actuator 131 provides for varying the angle of attack of blade 119. At the other end of the blade 119, mechanism 127 includes pivots 132 and 133 mounted on carriage 136 via X-Y motor 134. A slidable and rotatable bearing 137 supports one end of blade 119 and accommodates distance changes between the supporting bearings 137 and 138 as blade orientation changes. The mechanisms allow backsweep or forwardsweep of the blade, and/or flapping motion, or performing the undulating motion of the blade assembly by means of a joint action of the X-Y motors on both ends of the blade.

Alternatively the blades can be driven by a toothed belt running parallel to and along the entire track and mechanically propelled by gears driven by a suitable engine. Blade carriages in such embodiment will have flexible attachment plates attached to the back of the toothed belt in such a manner as to avoid stress concentrations in the belt around the place of such attachment.

In operation this embodiment can produce flapping and/or undulating blade motion while also providing the option of minute control of the blade speed independently of the blade carriage speed as it will be able to be moved backward by the X=Y motors on both ends of the blade while traversing parts of trajectory where lower speeds are needed, after which the blade can be moved forward in parts of the trajectory where higher speeds are desired thereby also repositioning it.

Figure 11:
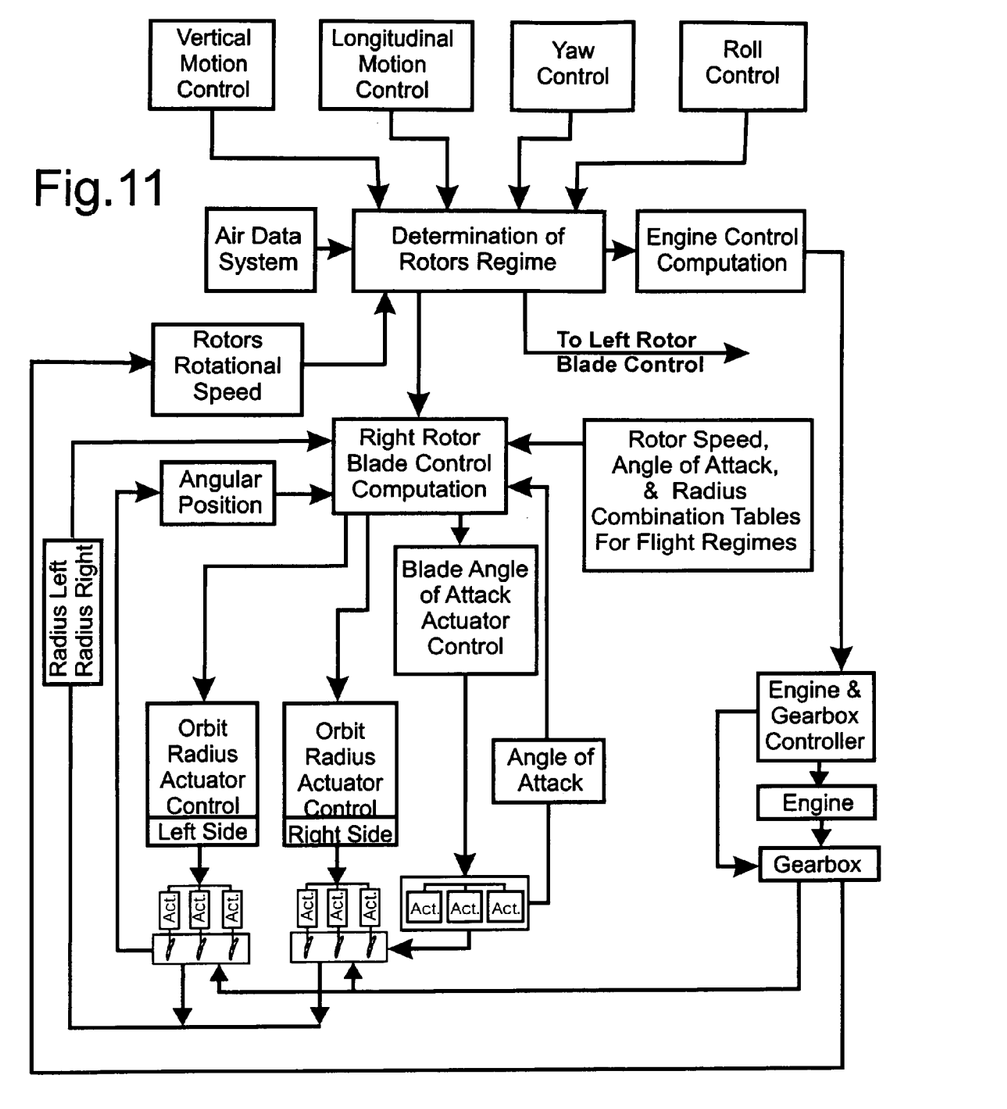
FIG. 11 is a block diagram of one embodiment of a control system for a cycloidal rotor of the present invention when used in an aircraft.

FIG. 11 is a block diagram of the control system. The control system includes input means representative of desired operating parameters, including roll, yaw, vertical and horizontal motion control. The system includes angular position indicator means indicating the angular orbital position of each blade; and computing means responsive to said input and the angular position indicator means for signalling the radius control means to activate the actuator for varying the radial distance of each blade from an axis of rotation. FIG. 11 also shows individual orbit radius control of each side of each blade. Additional actuators control blade angle of attack. FIG. 11 shows the control elements for one of the rotors (right rotor). Required control elements for the left rotor, which will be similar to the right, are not shown. It can be seen that seen that appropriately controlling each of the two opposite rotors independently will allow roll and yaw control of an aircraft as well as sideways motion.

The operation of an aircraft employing the cycloidal rotor of the present invention will be basically similar to that using a cycloidal rotor with circular orbit. Controlling each of two opposite rotors independently will allow roll and yaw control of the aircraft. The control and change of the angle of attack/incidence of the blades as they orbit can be basically similar to that of known cycloidal rotors, or by utilizing other known mechanisms. The actuators for blade positioning can be of various types, for example, electric, hydraulic or pneumatic. The significant distinguishing feature of the present invention involves changing of the geometry of the orbit of the blades, and the changeable spatial orientation of the blades for most embodiments, which will be controlled by a computer system based on pilot and other control input.

The cycloidal rotor of the present invention can be used for various types of applications, including, but not limited to, heavier and lighter than air aircraft, for the propulsion of airboats and boats, propeller snowmobiles and fans.

What is claimed is:

1. A cydoidal rotor having a plurality of airfoil blades mounted for orbiting about the rotor's axis of rotation; blade supporting means operative to position the blades to follow a generally non-circular trajectory about said axis of rotation; counterbalancing means for keeping the rotor balanced as the blades' radial positions change; blade pitch adjusting means for adjusting the blades angle-of-attack; and drive means for propelling the blades along said trajectory.

2. The cydoidal rotor of claim 1, inducing actuator means for positioning the blades radially with respect to the rotor's axis of rotation wherein said counterbalancing means comprises a counterweight associated with each blade which is operatively connected to the actuator means to move the said counterweight in the opposite direction to that of the blade when it is changing its radial distance from the rotor's axis of rotation.

3. The cydoidal rotor of claim 2, wherein each blade's supporting means includes pivoted mounting means and at least one actuator for pivoting the blade about the blade's yaw axis operative to provide backsweep or forwardsweep of the blade.

4. The cydoidal rotor of claim 2, wherein each blade's supporting means includes pivoted mounting means allowing flapping motion of the blade about a flap axis wherein said axis is generally tangential to blade trajectory.

5. The cycloidal rotor of claim 1, which comprises radial tracks for each blade and a guidance track having a shape corresponding to the desired orbit of the blades and includes associated with each blade radial track follower means and guidance track follower means for varying the radial distance of each blade as it travels along the guidance track about the rotor's axis of rotation.

6. The cydoidal rotor of claim 5, having a symmetrical guidance track where each blade counterbalances at least one other blade to keep the rotor balanced, as the blades change their radial distance from the rotor's axis of rotation.

7. The cycloidal rotor of claim 5, having a second guidance track and including second guidance track follower means attached to the blade for adjusting the angle of attack of the blade as the blade orbits about the rotor's axis of rotation.

8. The cycloidal rotor of claim 1, where the blade supporting means includes actuator means for positioning the blade radially from its axis of rotation; and input means providing control signals representative of desired operating parameters; and control means for activating the actuator means to position the blades radially a predetermined distance from the rotor's axis of rotation in relation to each blade's position along the orbit, as determined by angular position indicator means and in response to said control signals.

9. A method for generating lift or propulsive force comprising the steps of:
providing a cycloidal rotor with airfoil blades mounted on blade support means for following a non-circular orbit by using actuator means operatively connected to said blade support means for changing blades' radial position relative to the rotor's axis of rotation;
providing a computer control system operatively connected to said actuator means, for controlling the said radial position of the blade support means and operatively connected to actuator means for changing the angle of attack of the blades;
providing drive means for propelling the blades along a selected orbit;
propelling the blades along their orbits at a speed suitable for generating lift or propulsive force; and
initiating the computer control system to activate the respective actuator means to vary the blades' angle of attack and the said radial position of the blades in relation to the angular orbital position of the blade, and in response to control input transmitting desired operating parameters provided by input means, whereby each blade's relative airflow and aerodynamic performance will be controlled.

10. The method of claim 9 further including the steps of:
providing the actuator means for varying the yaw position of the blades;
providing the pair of spaced actuators for differential varying of the said radial positions of the blades' opposing ends;
providing the computer control system means for controlling the respective actuator means for varying the yaw position of the blade and for differential varying of the said radial positions of the blades' opposing ends;
initiating the computer control system to activate the actuator means to vary, when needed, the yaw position of the blades, thereby changing the blades yaw orientation in a manner suitable to improve the blades operating performance;
initiating the computer control system to activate the actuators for moving, when needed, the opposing ends of the blades to different radial positions relative to the rotor's axis, thereby producing a flapping motion of the blades about a flap axis wherein said axis is generally tangential to the blade trajectory, in a manner suitable to improve the blades operating performance.

11. A cycloidal rotor system having a plurality of airfoil blades each attached to blade support means wherein each blade support means includes track follower means mounted on a track having a non-circular shape corresponding to the desired orbit of the blade; blade pitch adjusting means for adjusting the blades angle-of-attack; and individual chive means for propelling the blades along said track.

12. The cycloidal rotor system of claim 11, wherein the track following means is magnetic levitation means for trajectory positioning of the blade.

13. A cycloidal rotor system having a plurality of airfoil blades each attached to blade support means wherein each blade support means includes track follower means mounted on a track having a non-circular shape corresponding to the desired orbit of the blade; blade pitch adjusting means for adjusting the blades angle-of-attack; drive means for propelling the blades along said track; and actuator means for varying the distance of the blade from the said track for dynamic modification of the blade's trajectory.

14. The cydoidal rotor system of claim 13, wherein each blade supporting means includes at least one actuator for pivoting the blade about a yaw axis of the blade operative to provide backsweep or forwardsweep of the blade.

15. The cydoidal rotor system of claim 13 wherein the blade supporting means includes a pair of spaced actuators for each blade whereby differential activation thereof operates to change the spatial orientation of the blade.

* * * * *